(12) United States Patent
McMaster et al.

(10) Patent No.: US 6,422,040 B1
(45) Date of Patent: Jul. 23, 2002

(54) METHOD FOR FORMING GLASS SHEETS

(75) Inventors: Ronald A. McMaster, Perrysburg; Michael J. Vild, Toledo; Donivan M. Shetterly, Rudolph; Paul D. Ducat, Perrysburg, all of OH (US)

(73) Assignee: Glasstech, Inc., Perrysburg, OH (US)

( * ) Notice: Subject to any disclaimer, the term of this patent is extended or adjusted under 35 U.S.C. 154(b) by 16 days.

(21) Appl. No.: 09/594,965

(22) Filed: Jun. 15, 2000

(51) Int. Cl.$^7$ .............................................. C03B 23/035
(52) U.S. Cl. ............................ 65/106; 65/25.1; 65/25.2; 65/25.4; 65/64; 65/182.1; 65/182.2; 65/244; 65/260; 65/273; 65/289; 65/290; 65/291; 65/307
(58) Field of Search ................................ 65/25.1, 25.2, 65/25.4, 106, 64, 182.1, 182.2, 244, 260, 273, 289, 290, 291, 307

(56) References Cited

U.S. PATENT DOCUMENTS

| | | | |
|---|---|---|---|
| 4,221,580 A | * | 9/1980 | Frank |
| 4,222,763 A | | 9/1980 | McMaster et al. |
| 4,282,026 A | | 8/1981 | McMaster et al. |
| 4,361,432 A | | 11/1982 | McMaster et al. |
| 4,364,765 A | | 12/1982 | McMaster et al. |
| 4,364,766 A | | 12/1982 | Nitschke |
| 4,437,871 A | | 3/1984 | McMaster et al. |
| 4,711,653 A | * | 12/1987 | Frank et al. |
| 4,746,348 A | * | 5/1988 | Frank |
| 4,859,225 A | * | 8/1989 | Kuster et al. |
| 4,990,170 A | * | 2/1991 | Vanaschen et al. |
| 5,004,491 A | * | 4/1991 | McMaster et al. |
| 5,330,550 A | * | 7/1994 | Kuster et al. |
| 5,376,158 A | | 12/1994 | Shetterly et al. |
| 5,393,316 A | * | 2/1995 | Sugiyama et al. |
| 5,755,845 A | * | 5/1998 | Woodward et al. |
| 6,009,726 A | * | 1/2000 | Funk |
| 6,038,887 A | * | 3/2000 | Vild et al. |
| 6,082,141 A | * | 7/2000 | Kuster |

* cited by examiner

*Primary Examiner*—Michael Colaianni
(74) *Attorney, Agent, or Firm*—Brooks & Kushman P.C.

(57) ABSTRACT

A method for forming glass sheets is performed by a system (10) that includes a furnace (12) having a heating chamber (14) in which a vacuum platen (20) has a downwardly facing surface (22) to which a vacuum is supplied to support a heated glass sheet received from a conveyor (16). A forming station (24) located externally of the furnace has a vertically movable upper mold (28) whose temperature is not greater than 500° C. The upper mold (28) cooperates with a horizontally movable lower ring (34). A first actuator (39) moves the vacuum platen (20) vertically to transfer a heated glass sheet from the conveyor (16) to the lower ring (34) which is then moved by a second actuator (40) to the forming station (24). A third actuator (42) then moves the upper mold (28) downwardly to cooperate with the lower ring (34) in forming the glass sheet. The forming station (24) includes apparatus (43) for reducing heat loss of the glass sheet during the forming. A vacuum impulse is provided to the upper mold (28) to assist in the forming. A cooling station (3) cools tHe formed glass sheet.

5 Claims, 2 Drawing Sheets

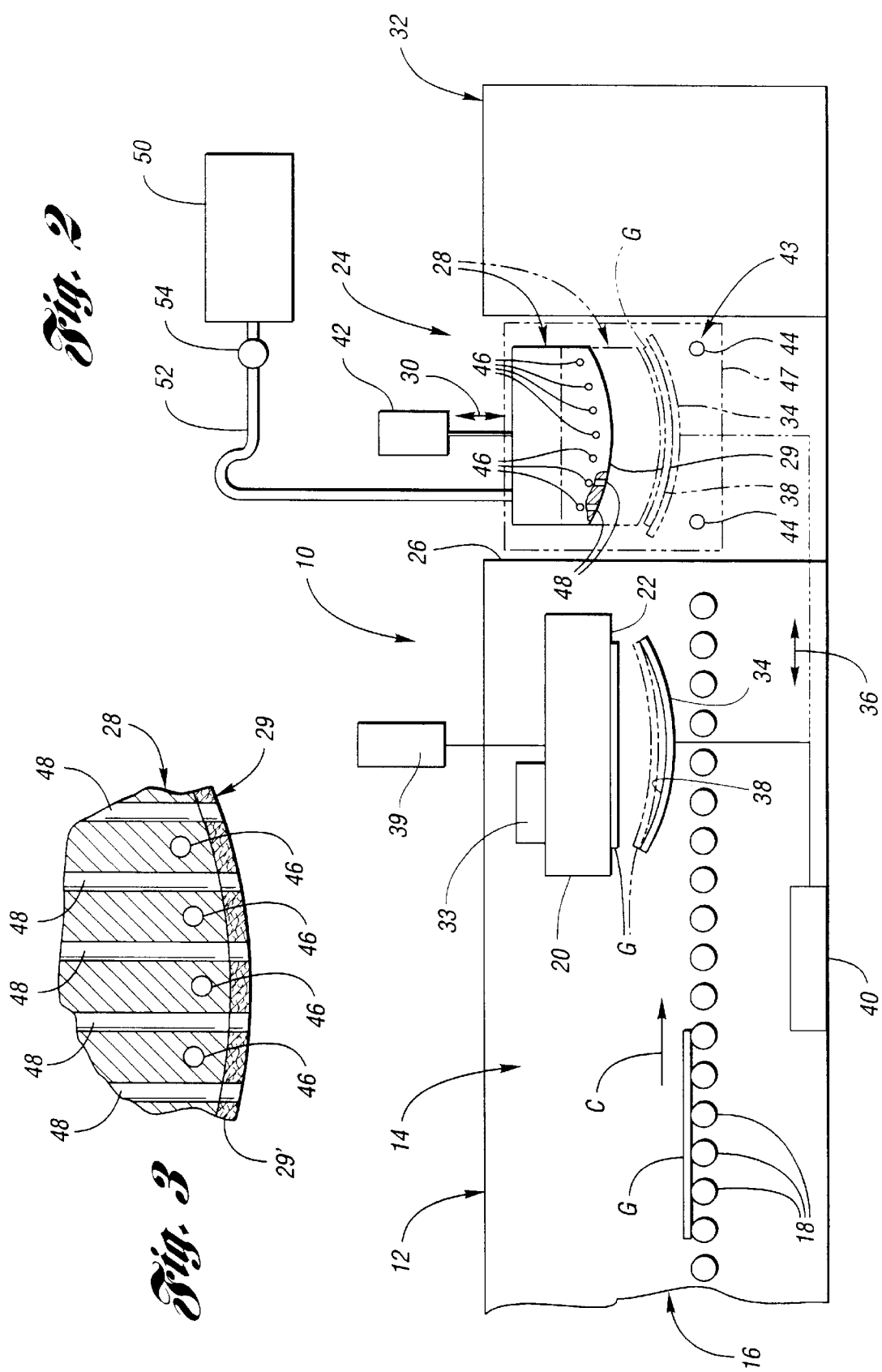

METHOD FOR FORMING GLASS SHEETS

TECHNICAL FIELD

This invention relates to a method for forming heated glass sheets.

BACKGROUND ART

Glass sheet forming systems conventionally include a furnace having a heating chamber in which a conveyor conveys glass sheets for heating to a sufficiently hot temperature to permit forming. Normally furnace heating chambers are heated to about 650 to 720° C. to provide glass sheet heating to about 620 to 660° C. for forming by one or more molds and optional subsequent quenching. U.S. Pat. No. 4,282,026 McMaster et al., U.S. Pat. No. 4,361,432 McMaster et al., U.S. Pat. No. 4,364,765 McMaster et al., and U.S. Pat. No. 4,437,871 McMaster et al. disclose vacuum platens that have a downwardly facing planar surface with spaced holes to which a vacuum is supplied for use in transferring heated glass sheets from a conveyor to a mold on which the glass sheet is formed within the heating chamber of the associated furnace.

While glass sheet forming has previously been conducted externally of a furnace heating chamber as disclosed by U.S. Pat. No. 5,755,845 Woodward et al., the transfer of the glass sheet to such external molds has previously been performed by roller conveyors which require a split mold for passing through the conveyor rolls to perform the forming. While use of external molds is desirable in allowing the use of materials that do not have to withstand the relatively high temperature of a furnace heating chamber, there has not heretofore been an effective system or method for performing glass sheet forming at an external location outside of the furnace heating chamber.

DISCLOSURE OF INVENTION

An object of the present invention is to provide an improved system for forming glass sheets.

In carrying out the above objects the system for forming glass sheets in accordance with the invention includes a furnace having a heating chamber including a conveyor for conveying glass sheets for heating sufficiently hot to permit forming of the glass sheets. A vertically movable vacuum platen is located within the heating chamber of the furnace and has a downwardly facing surface to which vacuum is supplied to support a heated glass sheet received from the conveyor. A forming station of the system has a vertically movable upper mold including a downwardly facing forming face, and the forming station and upper mold thereof are located externally of the furnace heating chamber so the upper mold does not have a temperature greater than 500° C. A horizontally movable lower ring of the system has an upwardly facing forming face. A first actuator of the system moves the vacuum platen downwardly to a lower position to receive a heated glass sheet from the conveyor and then moves the vacuum platen upwardly to a raised position. A second actuator moves the lower ring horizontally to a first position within tie heating chamber of the furnace below the vacuum platen in the raised position whereupon the lower ring receives a heated glass sheet from the vacuum platen, and the second actuator then moves the lower ring with the heated glass sheet thereon outwardly from the furnace heating chamber to a second position at the forming station below the upper mold. A third actuator of the system moves the upper mold downwardly toward the lower ring in the second position to cooperate with the lower ring in forming the heated glass sheet.

An object of the invention is to provide an improved method for forming glass sheets.

In carrying out the above object, the method for forming glass sheets in accordance with the invention is performed by conveying a glass sheet within a heating chamber of a furnace for heating sufficiently hot to permit forming of the glass sheet. A vacuum platen within the heating chamber of the furnace is moved downwardly to a lower position to receive and support the heated glass sheet and the vacuum platen is then moved upwardly to a raised position with the glass sheet supported by the vacuum platen. A lower ring is then moved into the heating chamber of the furnace to below the vacuum platen in its raised position with the heated glass sheet supported thereby above the lower ring. The heated glass sheet is then released from the vacuum platen and is received by the lower ring. The lower ring is then moved with the heated glass sheet thereon horizontally out of the heating chamber of the furnace to a forming station that includes an upper mold located externally of the furnace heating chamber so the upper mold has a temperature that is not greater than 500° C. The upper mold of the forming station is then moved downwardly to cooperate with the lower ring in forming the heated glass sheet.

In carrying out the glass sheet forming method, heat loss of the hot glass sheet is reduced during the forming.

The forming method is also performed utilizing an impulse vacuum that is supplied to the upper mold to assist in the glass sheet forming.

The glass sheet forming method is also disclosed as including moving the formed glass sheet horizontally from the forming station to a cooling station for cooling which may be annealing, heat strengthening or tempering.

The objects, features and advantages of the present invention are readily apparent from the following detailed description of the best mode for carrying out the invention when taken in connection with the accompanying drawings.

BRIEF DESCRIPTION OF DRAWINGS

FIG. 2 is a partial schematic side similar to FIG. 1 but illustrating further stages of the glass sheet furnace cycle.

FIG. 3 is a partial view showing a heat insulative cover on a forming face of an upper mold of a forming station of the system.

BEST MODE FOR CARRYING OUT THE INVENTION

Figure 1:
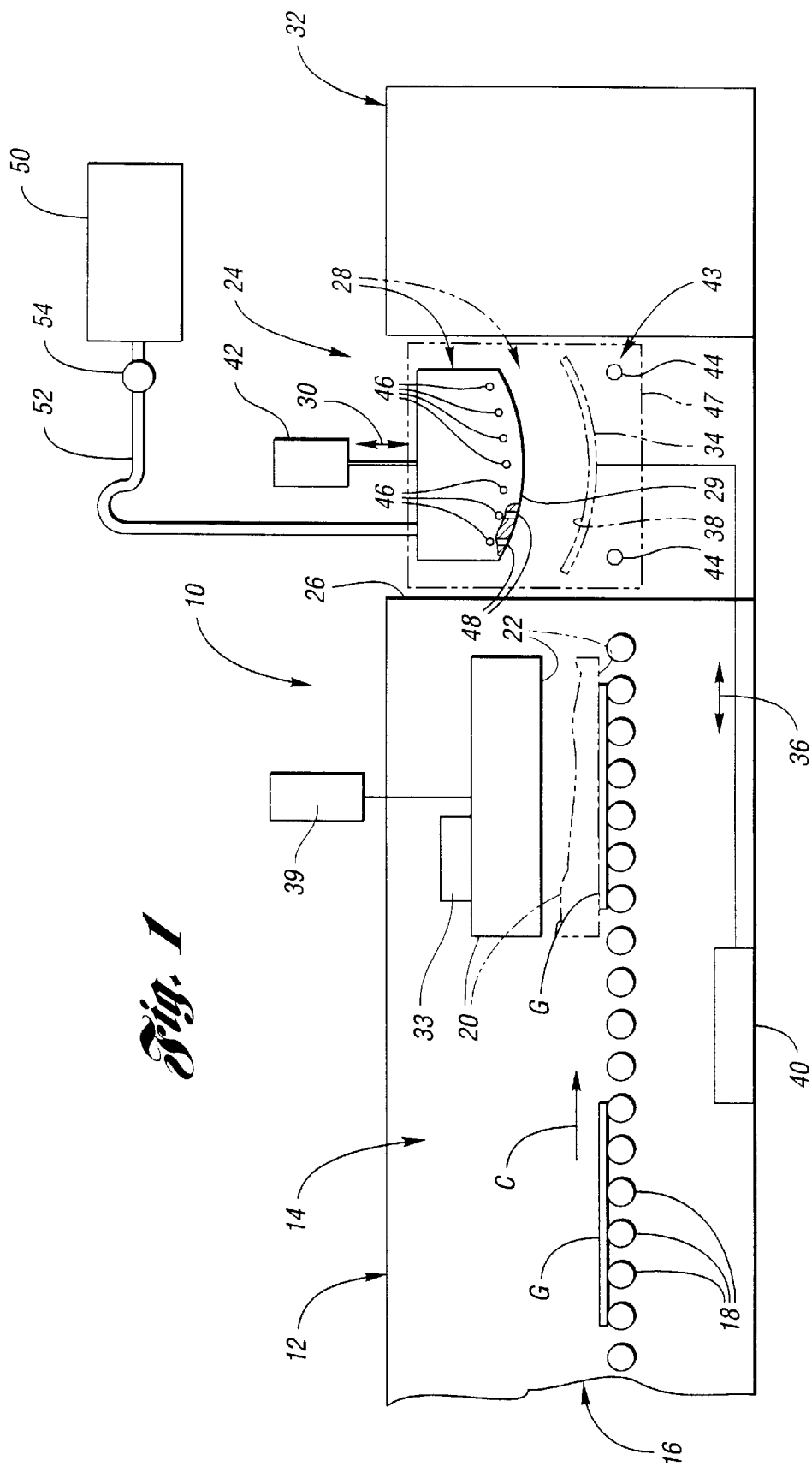
FIG. 1 is a schematic side elevational view of a glass sheet forming system constructed in accordance with the invention to perform glass sheet forming.

With reference to FIG. 1, a schematically illustrated glass sheet forming system 10 is constructed to perform the method of the invention. Forming system 10 includes a furnace 12 having a heating chamber 14 that includes a roll type conveyor 16 including rolls 18 for conveying glass sheets G along a direction of conveyance shown by arrow C so as to be heated sufficiently hot to permit forming of the glass sheets. A vacuum platen 20 is located within the heating chamber 14 of the furnace 12 and has a downwardly facing surface 22 to which a vacuum is supplied to support a heated glass sheet received from the conveyor as is hereinafter more fully described. Normally the furnace heating chamber will be heated to 650 to 720° C. to provide a heated glass temperature of about 640 to 660° C. A forming station 24 of the system is located externally of the furnace heating chamber at the right exit end 26 of the furnace. This forming station 24 has an upper mold 28 that has a downwardly facing forming face 29 and is movable vertically as shown in FIG. 2 by arrows 30 between the solid line indicated upper position and the phantom line indicated lower position as is hereinafter more fully described. To the right of the forming station 24, the system 10 is shown as also including a cooling station 32 for cooling the formed glass sheet.

The vacuum platen 20 may be of the type disclosed by U.S. Pat. No. 4,282,026 McMaster et al. A vacuum is supplied to spaced holes in the downwardly facing surface 22 of the vacuum platen 20 by a vacuum generator 33 which may be a gas jet pump of the type disclosed by U.S. Pat. No. 4,222,763 McMaster. Upstream from the vacuum platen 20, a sensor may sense the glass sheet as well as provide positioning thereof and also providing a signal to a control conveyor adjacent the vacuum platen for slowing down the glass speed of conveyance prior to be received by the vacuum platen as disclosed by U.S. Pat. No. 4,364,766 Nitschke. The entire disclosures of each of these patents are hereby incorporated by reference.

With reference to FIG. 1, the glass sheet forming system 10 includes a lower ring 34 that is movable horizontally as shown by arrows 36 and has an upwardly facing forming face 38 that is of a peripheral construction generally corresponding to the periphery of the glass sheet G to be formed. A first actuator 39 commences a cycle of glass sheet forming by moving the vacuum platen 20 downwardly to the phantom line indicated lower position to receive a heated glass sheet G from the conveyor 16. The first actuator 39 then moves vacuum platen 20 upwardly to the solid line indicated raised position with the heated glass sheet G supported thereby as shown in FIG. 2 and a second actuator 40 moves the lower ring 34 horizontally to a first position shown by solid line representation within the heating chamber 14 of the furnace 10 where the lower ring receives a heated glass sheet from the vacuum platen 20 upon termination of support thereof as the vacuum is terminated. The first actuator 40 then moves the lower ring 34 outwardly from the furnace heating chamber as shown in FIG. 2 to a second position shown by phantom line representation at the forming station 24 below the upper mold 28. A third actuator 42 then moves the upper mold 28 downwardly toward the lower ring 34 in the second position to cooperate with the lower ring in forming the hot glass sheet, and the upper mold is subsequently moved upwardly back to the upper position in preparation for the next cycle.

The location of the upper mold 28 externally of the furnace heating allows it to operate at a much lower temperature than molds that are mounted for functioning internally within the furnace heating chamber in a more conventional manner. Furthermore, the manner in which the externally located upper mold 28 cooperates with the lower ring 34 that receives the hot glass sheet from the vacuum platen provides effective delivery as well as forming of the glass sheet. More specifically, the upper mold 28 can be fabricated from cold rolled carbon steel or cast from iron and for relatively lower temperatures of about 300° C. and below it is possible to use aluminum and epoxy molds, none of which would be useable in the hot environment of the furnace heating chamber. Furthermore, the upper mold 28 can also be cast from certain refractories that have heat insulative properties and do not require significant machining. Thus, this system also provides for lower tooling costs since the upper mold 28 can be constructed more economically and thereby renders the system effective for low volume production by reducing the tooling costs for each formed glass sheet.

With continued reference to FIG. 1, the forming station 24 includes apparatus collectively indicated by 43 for reducing heat loss of the hot glass sheet G during the forming. This apparatus 43 is disclosed as including auxiliary heaters 44 that may be either electric resistance heaters or gas heaters for providing auxiliary heat to the forming station to reduce the heat loss from the hot glass sheet G. The heat loss reducing apparatus 43 also includes heaters 46 in the upper mold 28 of the forming station. These mold heaters 46 may be electric resistance heaters and provide heating of the forming face 29 to reduce heat loss from the hot glass sheet to the mold upon the mold-glass engagement that provides the glass sheet forming. Furthermore, the heat loss reducing apparatus as shown in FIG. 3 may also include a heat insulative cover 29', which may be ceramic paper, on the forming face 29 for reducing heat flow from the hot glass sheet to the upper mold 28 during the engagement that provides the glass sheet forming. Alternately, the forming face 29 may be made of a heat insulating material. Furthermore, the heat loss reducing apparatus 43 as shown in FIG. 1 may also include an enclosure 47 that reduces convective air drafts and encloses the forming station to prevent heat loss from the hot glass sheet. This enclosure 47 can be a separate chamber of the furnace but must be external of the heating chamber so as to have a lower temperature such that the upper mold 28 does not have a temperature greater than about 500° C.

The upper mold 28 of the forming station 24 preferably includes openings 48 to which a vacuum impulse is supplied from a vacuum reservoir 50 through a conduit 52 under the control of a valve 54. This vacuum impulse assists in the forming between the upper mold 28 and the lower ring 34 in accordance with the teachings of U.S. Pat. No. 5,376,158 Shetterly et al., the entire disclosure of which is hereby incorporated by reference.

The cooling station 32 of the system 10 is located to the right of the forming station 24 as previously mentioned and provides cooling of the glass sheet upon movement thereto such as by continued movement to the right of the lower ring 34 after the forming at the forming station or by movement of the glass sheet to the right on another mold.

While the best mode for carrying out the invention has been described in detail, those familiar with the art to which this invention relates will recognize various alternatives, designs and embodiments for practicing the invention as defined by the following claims.

What is claimed is:
1. A method for forming glass sheets, comprising:
conveying a glass sheet within a heating chamber of a furnace for heating sufficiently hot to permit forming thereof;
moving a vacuum platen within the heating chamber of the furnace downwardly to a lower position to receive and support the heated glass sheet and then moving the vacuum platen upwardly to a raised position with the heated glass sheet supported thereby;
moving a lower ring into the heating chamber of the furnace to below the vacuum platen in its raised position with the heated glass sheet supported thereby;
releasing the heated glass sheet from the vacuum platen so as to be received by the lower ring;
moving the lower ring with the heated glass sheet thereon horizontally out of the heating chamber of the furnace to a forming station that includes an upper mold located externally of the furnace heating chamber so the upper mold has a temperature that is not greater than 500° C.; and moving the upper mold of the forming station downwardly to cooperate with the lower ring in forming the heated glass sheet.

2. A method for forming heated glass sheets as in claim 1 wherein heat loss of the hot glass sheet is reduced during the forming.

3. A method for forming heated glass sheets as in claim 1 wherein an impulse vacuum is supplied to the upper mold to assist in the glass sheet forming.

4. A method for forming heated glass sheets as in claim 1 wherein the formed glass sheet is moved horizontally from the forming station to a cooling station for cooling.

5. A method for forming glass sheets, comprising:

conveying a glass sheet within a heating chamber of a furnace for heating sufficiently hot to permit forming thereof;

moving a vacuum platen within the heating chamber of the furnace downwardly to a lower position to receive and support the heated glass sheet and then moving the vacuum platen upwardly to a raised position with the heated glass sheet supported thereby;

moving a lower ring into the heating chamber of the furnace to below the vacuum platen in its raised position with the heated glass sheet supported thereby;

releasing the heated glass sheet from the vacuum platen so as to be received by the lower ring;

moving the lower ring with the heated glass sheet thereon horizontally out of the heating chamber of the furnace to a forming station that includes an upper mold located externally of the furnace heating chamber so the upper mold has a temperature that is not greater than 500° C.;

moving the upper mold of the forming station downwardly to cooperate with the lower ring in forming the heated glass sheet;

reducing heat loss from the hot glass sheet at the forming station during the forming; and moving the formed glass sheet horizontally from the forming station to a cooling station for cooling.

\* \* \* \* \*